United States Patent
Gettys et al.

(10) Patent No.: US 11,138,314 B1
(45) Date of Patent: Oct. 5, 2021

(54) SOFTWARE AND FIRMWARE VERIFICATION BY DISTRIBUTED LEDGER AND INTRUSION DETECTION SYSTEMS

(71) Applicant: Muinin Corporation p.b.c, Mill Valley, CA (US)

(72) Inventors: James Gettys, Carlisle, MA (US); D Ramesh K. Rao, Menlo Park, CA (US); John Ryan, Sausalito, CA (US)

(73) Assignee: Muinin Corporation p.b.c., Mill Valley, CA (US)

(*) Notice: Subject to any disclaimer, the term of this patent is extended or adjusted under 35 U.S.C. 154(b) by 0 days.

(21) Appl. No.: 17/026,970

(22) Filed: Sep. 21, 2020

Related U.S. Application Data

(60) Provisional application No. 62/905,362, filed on Sep. 24, 2019.

(51) Int. Cl.
*G06F 11/00* (2006.01)
*G06F 21/56* (2013.01)
*H04L 9/32* (2006.01)
*G06F 8/71* (2018.01)
*G06F 8/60* (2018.01)

(52) U.S. Cl.
CPC .............. *G06F 21/565* (2013.01); *G06F 8/71* (2013.01); *H04L 9/3236* (2013.01); *G06F 8/60* (2013.01); *G06F 2221/033* (2013.01); *H04L 2209/38* (2013.01)

(58) Field of Classification Search
CPC .................................................... G06F 21/565
USPC ........................................................... 726/23
See application file for complete search history.

(56) References Cited

U.S. PATENT DOCUMENTS

| | | | |
|---|---|---|---|
| 8,161,458 B2* | 4/2012 | Johnson | G06F 11/3688 717/124 |
| 2017/0212750 A1* | 7/2017 | Stutzenberger | F04B 43/1261 |
| 2019/0245680 A1* | 8/2019 | Boutaba | G06F 21/64 |
| 2020/0042313 A1* | 2/2020 | Shafi | G06F 8/658 |

* cited by examiner

*Primary Examiner* — Evral E Bodden
(74) *Attorney, Agent, or Firm* — Anderson Gorecki LLP

(57) ABSTRACT

A software ecosystem includes a software supply chain in which each of the participants in the software supply chain produce software components using reproducible builds. By using deterministic compilation practices, each of the software components produced by a respective participant should be identical. The software ecosystem also includes a set of tamper proof distributed ledgers. Hashes of the software components are generated and securely recorded in the set of distributed ledgers. The software ecosystem also includes an intrusion detection system configured to compare hashes of the software components to determine when one or more of the software components has been generated in a corrupt manner. The secure software ecosystem includes a full-platform approach to integrity which incorporates designing against attacks, rather than patching after them, which creates a paradigm in which computing platforms can be trusted because they have been designed to operate in an untrustworthy environment.

17 Claims, 11 Drawing Sheets

Full Bootstrap

Diverse double compilation

SOFTWARE AND FIRMWARE VERIFICATION BY DISTRIBUTED LEDGER AND INTRUSION DETECTION SYSTEMS

CROSS-REFERENCE TO RELATED APPLICATIONS

This application claims priority to provisional patent application No. 62/905,362, filed Sep. 24, 2019, entitled "Reproducible Builds Application by Distributed Ledger and Intrusion Detection Systems", the content of which is hereby incorporated herein by reference.

FIELD

This disclosure relates to computing systems and related devices and methods, and, more particularly, to a system and method for tracking of hardware and software components from inception, to use, and revision, in a software supply chain.

BACKGROUND

A software supply chain is used to enable software to be created and delivered to end users. There are often many entities in a given software supply chain. For example, software code may be created by a programmer and delivered by the programmer to an original software repository such as git, or as a source package released in any of a number of archive formats, such as tar, zip, etc. The source package is then provided to a distribution provider, which packages the software and makes the software available in binary form, configured for a specific environment of system hardware and software. Often the software is then made available via numerous mirror sites. Program integrators may then package the software with other programs to create integrated implementations of a specific application, which are ultimately downloaded and installed on customer machines.

Unfortunately, the software supply chain can be attacked in numerous ways at each stage of the process. For example, in some software ecosystems, the original software is provided to a build server, which is used to build instances of the software for distribution to end users. If the build server is successfully attacked, it is possible for the attacker to inject malicious code into all of the built instances of the software. This can go undetected for long periods of time, for example for years, thus providing the attacker with access to the end systems via each instance of the software that was built from the compromised build instance.

As another example, a software update server can be attacked such that when laptop users update the software on their laptop computers, the update includes malicious code. This can be successfully implemented using a man-in-the middle type attack, for example, if there is a compromised signing key. Once again, when the update server is successfully attacked, the attack does not only affect a single end system, but rather affects all end systems that are updated from the software update server.

One common way to try to prevent attacks on end user machines is to scan the end user machine for known malware e.g.: virus checking. This approach is vulnerable to all "zero day" attacks, e.g. "Man-In-The Middle" attacks, which can occur when an attack occurs higher up the supply chain. These systems also have limited ability to check package and file checksums, which when kept "on system" can themselves be attacked. Some "high value systems" are scanned for intrusions e.g.: file integrity and by log analysis, and these are vulnerable to supply chain attacks, since the original bits may be compromised. Both approaches are too "noisy" for routine widespread use due to frequent system updates and system variability.

Accordingly, a need exists in the field for a novel approach to implement verification of installed software and hardware so that the history of the software and hardware can be trusted to a known level. Specifically, it would be advantageous to provide a fundamentally different security environment, where systems are known to be running intended code, and any malware is detected at the time of compromise, rather than after virus checkers can be updated to detect the malware.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, reproducible builds and bootstrappable builds are used to make it possible to verify that binary code actually corresponds to the source code. Reproducible builds are used to enable multiple independent people to rebuild the same software reproducibly, and compare the results. If there is any difference between the builds, the binary is suspect. If builds are truly reproducible, two independent uncompromised build systems are sufficient to detect that tampering has occurred, or that a build was not reproducible. The more independent build systems there are, the more likely that an attacker will not find it feasible to compromise the system.

There is an additional subtle process needed to ensure the correspondence of source and binary code, or else reproducible builds would only ensure you get the same possibly "wrong" answer (including malware), rather than binaries that are not corrupted. Bootstrappable builds can be used to ensure that the software compilers used to transform the source to binary have not been tampered with. This prevents the software from being attacked at the compiler level to thereby solve the "Thompson attack." (See: Communication of the ACM, Vol. 27, No. 8, August 1984, in a paper entitled "Reflections on Trusting Trust", presented as Ken Thompson's Turing Award lecture). The compiler toolchain can be bootstrapped from a compiler small enough to be bench verified (FIG. 9) or verified by "Diverse Double Compilation". (See: David A. Wheeler's thesis as shown in https://wheeler.com/trusting-trust/ (FIG. 10)).

To prevent the results of the reproducible builds and bootstrappable builds from being tampered with undetectably, a set of distributed secure ledgers is used to compare a hash of the software with hashes of other similar software. Information such as a hash of the software, can be appended to a ledger, and securely distributed to hosts all over the internet. The integrity of the ledgers themselves, as opposed to the systems feeding data into the distributed ledgers, can be verified internally; that is the point of the distributed ledger system. Since there will be multiple such distributed ledgers and software builders, the results can be intercompared, and any tampering detected anywhere in the software/firmware supply chain. As in the Certificate Transparency project and via Reproducible Builds, defectors or compromised builders can be detected independently, and corrective action taken.

Distributing the software "Bill Of Materials" information, i.e. hashes for all software packages and files, via such a secure distributed ledger system, eliminates the current weaknesses in host-based intrusion detection systems, which rely on a "golden copy" snapshot of software and firmware, which may have been tampered with at the source in its build-system and/or en-route to the host before this "golden copy" can even be produced. And detection of out-of-date software and firmware can be performed each time the host software and firmware is validated—which might be periodically, or ultimately, given kernel support, on an ongoing instantaneous basis, rather than waiting for an update to another "golden copy" snapshot. This reduces greatly the "window of vulnerability" and notifies IT staff of issues that should require attention in an automated fashion.

In some embodiments, the distributed ledger system is also used to automate the installation of software updates. If an end user attempts to use an older version of the software, the hash of the older version will not match the hash of the current version, thus prompting the end user to install the updated version of the software. Once the update is installed, the hash of the updated software will be compared with the hash of other end user's versions of the updated software to verify that the user has a verified updated version of the updated software.

This also enables immediately flagging that an update path, a "mirror", may have been compromised. Software updates are often distributed worldwide across many local software update mirror servers, any of which can be broken into and compromised. For example, Debian Linux has several hundred mirrors world-wide. If a mirror is successfully attacked, the software updates downloaded and installed from that mirror may enable malware to be installed on end user systems. By using a distributed ledger system in which hashes of the updates are compared prior to being installed by end users, it is possible to detect the attack in advance to prevent the malware from being distributed to end users. This enables software updates to be securely distributed to ensure that all systems are updated, which can be very helpful in preventing 0-day attacks.

The distributed ledger system guards against tampering with the build data, and provides large scale caching of the information, since the ledger is append-only, and provides redundancy against attacks against a single ledger or network path to the host. Attacks against the software distribution system become immediately apparent; sufficient information is "out of band" of those systems to provide true redundancy, in this case, verifying integrity all the way back to the source code being distributed.

Verification, using the distributed ledger system, makes it possible to ensure that Information Technology systems do only what they are designed to do, and nothing else. This includes a full-platform approach to integrity which incorporates designing against attacks, rather than patching after them, which creates a paradigm in which computing platforms can be trusted because they have been designed to operate in a world we cannot trust.

"Who to trust" is always a difficult problem. The choice of which person/organization to trust is left in the hands of the Intrusion Detection System; a government, for example, might only choose to trust distributed secure ledgers that it generates. This provides incentives for independent builds of software on a global scale. As in DNS Certificate Transparency, monitoring distributed ledgers for correctness and integrity enables a global scale "web of trust" to develop as organizations that provide defective or compromised ledgers can be detected and measures taken against those organizations.

At scale implementation of Reproducible Builds software has to assure, always, that software is correct in operation, at boot, and for the design tool chain. In some embodiments, this is implemented through a decentralized ledger technology to keep integrity records intact and secure, to allow life-cycle data to enable correlation of variant behaviors with variant events in provenance and live detection/notification of variant behaviors.

In some embodiments, the distributed ledger system is used to ensure the integrity not only of software, but also of firmware and hardware.

Today, when you access a (micro)service on the Internet, you are entirely taking on faith that it has not been compromised by malware. An additional embodiment exploits the distributed ledger system to enable third parties to have some assurance that an application they are accessing, for example, via the Web, is running on a system that has not been tampered with. In this case, the system or container in which the application is running publishes a secure ledger of all software running to provide that application, along with periodic signatures from the intrusion detection system that "all is well", that is that the expected software is installed and has been checked against tampering. If the check fails, the client can then not trust the provided information, and might report the issue to the operator of the service.

This document describes an implementation based on secure distributed ledgers, although other embodiments might utilize other distributed logs or blockchain based technologies. There are major scaling and deployment advantages that these ledger systems provide, since they can be published by anyone without prior arrangement with any organizations. Other implementations of the concepts herein are possible, for example, using "blockchain", which while possible, would be less efficient and harder to deploy. Nothing in this document is intended to limit the embodiment of an implementation to secure distributed ledgers.

DETAILED DESCRIPTION

Figure 1:
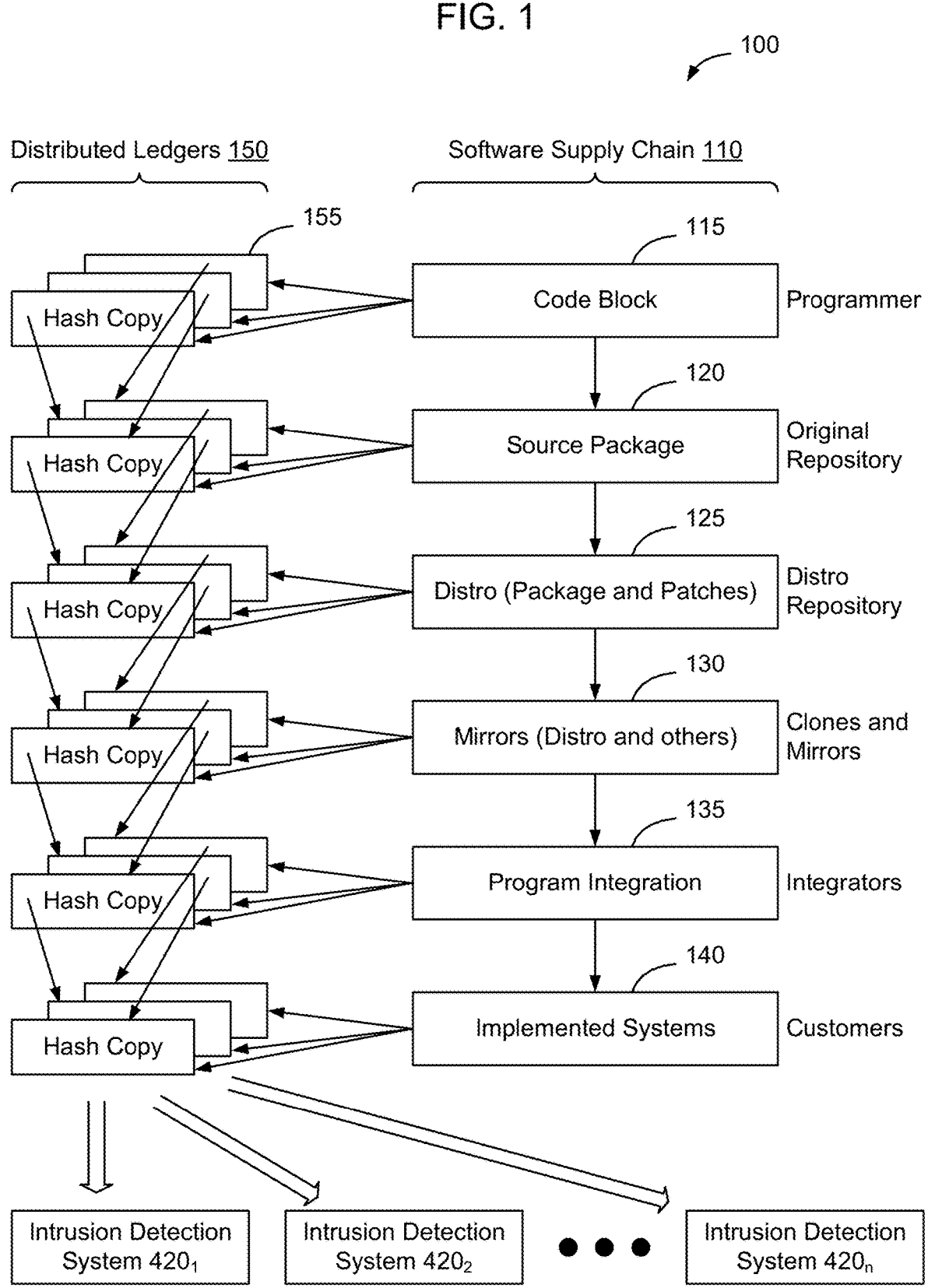
FIG. 1 is a functional block diagram of an example software ecosystem including an example supply chain configured to implement reproducible and bootstrappable builds secured by a set of distributed ledgers and an intrusion detection system, according to some embodiments.

As discussed in greater detail herein, the use of reproducible builds, bootstrappable builds, and distributed ledgers, addresses the problem where a computer system's integrity can be compromised in the software supply chain, and at any time after supply, anywhere from original software development to the end system running the installed code. By using distributed ledgers and reproducible builds technology, end system integrity can be verified all the way back to the original software package, in (near) real time. This provides an outcome which has a fundamentally different security environment, where systems are known to be running the intended code, and any malware is detected at the time of compromise, rather than after virus checkers, etc. can be updated to detect the malware, which conventionally often would occur days/weeks/months later, and only after discovery of a compromise.

By providing a security solution based on reproducible builds, open source, distributed ledger, and artificial intelligence technologies, it is possible to provide trust and confidence in the software and hardware integrity of digital machines. The platform has the capability to compare the list of reproducible-built software running on a machine to multiple decentralized ledgers from independent sources. This enables trust and confidence that a machine is running only trusted software of known provenance that constantly assures the integrity of the software.

In a large-scale implementation, in which the number of distributed ledgers is growing rapidly and the number of applications with hashes is also growing rapidly, the checks against the ledgers for verification will also increase in a geometric fashion. The number of failures in verification might also increase rapidly. In some embodiments, an intrusion detection system is used to actively track any modifications, changes or tampering. Many intrusion detection systems may be monitored by monitor software for common patterns of hash failures. The remote monitors communicate with the intrusion detection system to collect and consolidate the data, and warn those intrusion detection systems of issues that might look minor, but are serious when monitored on a large scale where patterns may become apparent.

As a result, in some embodiments, the intrusion detection system is configured to look for patterns in software failures by analyzing the large-scale data on a dynamic real time basis, and also make actionable conclusions based on the failures and successes in an automated self-learning way. In some embodiments, the intrusion detection system uses a combination of traditional computing methods and algorithms in conjunction with more recent methods in machine learning and Deep Neural Networks and other Artificial Intelligence techniques. The analysis uses standard techniques not precluding others, including a combination of methods such as Neural Networks, logistical regression, k-maps, gradient descent, etc., to optimize the results by looking for patterns in the tampering amongst and across the ledgers, in order to have an actionable response to current tampering or to predict future tampering, and to draw attention to current points of attack.

In some embodiments, the techniques described herein allow multiple independent parties, who are building the software, to implement internal security to prevent internal attacks on the software. By comparing hashes of software versions, if the hashes do not match, then parties are alerted to an integrity corruption. In the case of a two-party check of integrity, an attacker would need to implement a simultaneous attack against both versions, thus greatly increasing the difficulty of the attack. The difficulty increases further with the number of increasing independent parties generating and storing results on multiple independent ledgers. Three or more parties help identify which party is the "victim" of an attack.

In some embodiments, the use of reproducible builds, bootstrappable builds, and distributed ledgers, also leverages the ongoing work in improving software distribution systems. For example, cryptographic signatures can be used to help secure exchange of software components between members of the software supply chain, and to help secure transmission of the hash records from the software supply chain to the distributed ledgers. Additionally, to prevent against rollback attacks, in which an attacker tries to trick a client into installing an outdated version of the software, in some embodiments the use of distributed ledgers ensures freshness of the software by never allowing a user to install files older than those that have been seen previously, and automatically recognizes when there may be a problem with the obtained update, since a hash of the older update version will not match the hash of the current version of the update.

In some embodiments, due to the complete independence of the actors in the software ecosystem, attacks based on stolen keys become much more difficult, as compromise initiated by a stolen key of a single builder does not compromise all the ledgers at the same time. Therefore, the software ecosystem enables the multiple independent builders to mutually help each other to detect that their systems may have been compromised; an attacker will find it hard to simultaneously compromise multiple organizations.

As used herein, the term "reproducible builds" is used to refer to a set of software development practices that create an independently-verifiable path from source to binary code. This enables independent verification of the software supply chain, removing a large class of security attacks from the table. Reproducible builds is a process of compiling software, which ensures that the resulting binary code can be reproduced. Source code compiled using deterministic compilation will always produce the same binary. To enable the compilation process to be deterministic, the input to the compiler must be the same, regardless of the build environment. For example, variables in the source code that may change, such as the order of the input files, timestamps, locales, and paths, must all be normalized. Additionally, the compiler should be deterministic.

The Reproducible Builds project has been underway since 2015, and is making good progress given such ambitious goals. Participants at the last Reproducible Builds summit included: Alpine Linux, Arch linux, bootstrappable.org, Bazel, coreboot, Debian, F-Droid, Google, GNU Guix, GNU Mes, Huawei, IPFS, in-toto, Microsoft, MirageOS, NetBSD, NixOS, openSUSE, OpenWrt, pantsbuild.org, Qubes OS, Tails, Tor Project, and more. Debian, which is currently the largest free software repository, has a status wherein greater than 92% of packages are reproducible, and the installer is almost reproducible, which is a major milestone. Other smaller system distributions are completely: e.g. OpenWrt, coreboot, NetBSD, along with key applications, such as the Signal chat/teleconferencing application.

FIG. 1 shows an example software ecosystem 100 including a software supply chain 110 of which there may be many, a set of distributed ledgers 150, of which there may be many, and a set of intrusion detection systems $420_1$-$420n$. In some embodiments, the software supply chain includes multiple participants that collaborate to generate, distribute, package, integrate, and ultimately provide software for end users. At each stage of the software supply chain 110, a hash record 155 of the software can be generated and stored in one of the distributed ledgers 150. The intrusion detection systems 420 compare the hash of the software at that stage of the software supply chain 110 with hashes of other implementations of the software at that stage of the software supply chain 110. If the hashes match, it is possible for the intrusion detection system to verify that the software has not been tampered with. If the hashes don't match, the intrusion detection system can detect that the software is different than other versions and may have been tampered with.

For example, as shown in FIG. 1, in some embodiments a software supply chain 110 may include a programmer that generates a block of code 115. The block of code is provided to an original repository, where it is included in a source code package 120. The source package is then provided to a distribution repository which compiles the software to create binary builds, and distributes packages of software and patches of the software 125. Optionally, one or more mirrors 130 may be used to distribute the software packages and patches to a set of integrators who implement program integration 135. The integrated programs are then installed by customers as implemented systems 140.

If the software generated by the programmer is implemented as a reproducible build, the hash of the software, at each level of the software supply chain, should be the same regardless of who implements the hash. Thus, if the code 115 is implemented in a source package 120 at multiple repositories, the hash of the source package 120 at each repository should be consistent. By logging the hashes in a distributed ledger, and comparing the hash copies of the source packages in the ledgers, it is possible to determine whether one of the source packages has an incorrect version of the code 115, which may indicate that the version has been attacked. Since the distributed ledgers are implemented using block chain or some other technology that prevents the entries of the ledgers from being changed, the distributed ledgers provide a secure way to ensure that the current hash is being checked against verified previous hashes of the same software. By implementing the hash based checking using the distributed ledgers at each level of the software supply chain 110, it is possible to verify the implemented system 140 all the way back to the original code 115.

Figure 2:
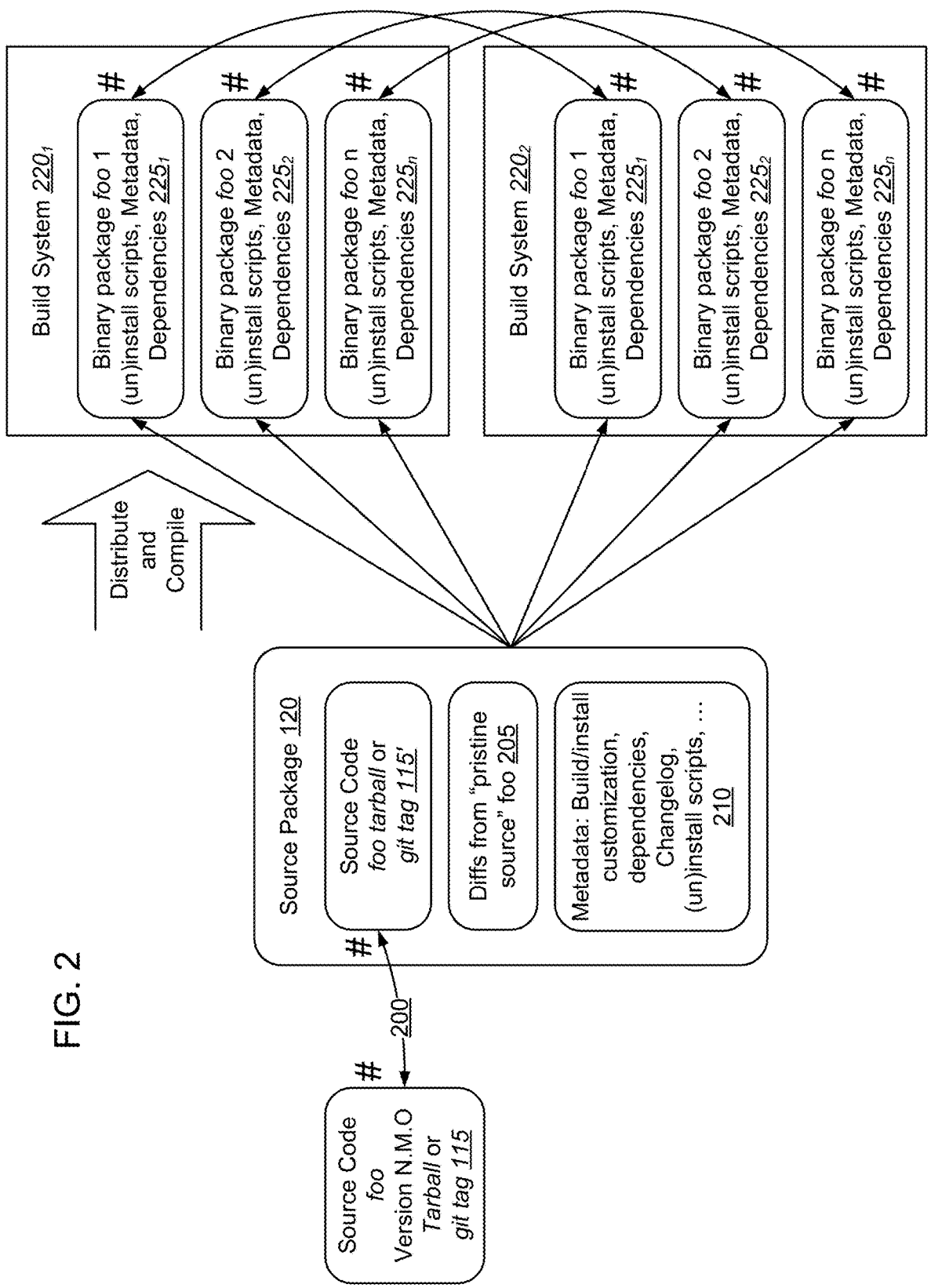
FIG. 2 is a functional block diagram graphically depicting the process of generating the reproducible builds, starting off with the original developer, then the package maintainer, and finally the build systems, according to some embodiments.

FIG. 2 is a functional block diagram graphically depicting the process of generating the reproducible builds, starting off with the original developer, then the package maintainer, and finally the build systems, according to some embodiments. In FIG. 2, the original source code is titled "foo", which has a version number N.M.O., and includes a collection of files implemented as a "tarball" or git tag. The original source code is forwarded (arrow 200) to an original repository and added to the source package 120. As shown in FIG. 2 (using the symbol #), a hash of the original source code 115 is generated by the programmer and stored in a distributed ledger 150 configured to store hash records for the software. A hash of the source code 115' that is included in the source package 120 is also generated, and stored in the distributed ledger. If the hash of the source code 115' that is included in the source package does not match the hash of the source code 115, the original repository is able to determine that the source code 115' that has been included in the source package 120 is not the same as the original source code 115.

This prevents multiple forms of attack. For example, after the original programmer created the code and implemented the hash, another person with access to the code may modify the source code 115 prior to storing the source code in the original distribution repository. Similarly, the original source code could be intercepted in-between the developer and repository (along arrow 200). Finally, the source code could be modified at the original repository prior to or once it is included in the source package 120. By checking the hash of the code 115' in the source package 120 against a hash of the original source code 115, it is possible to ensure the source package 120 that is used to build the build systems includes the correct version of the code 115.

As shown in FIG. 2, the source package in some embodiments includes components in addition to the verified source code 115'. For example, the source package 120 may include a file 205 containing the differences from the pristine source of the software foo, and a metadata file 210 which identifies various pieces of information about the source code 115', such as the build/install customization information, dependencies, changelogs, (un)install scripts, and other such information. Each of these components can be verified using hashes that are similarly stored in the distributed ledgers 150.

The source package is then used to create build systems 220, which are separately independently created by different unaffiliated organizations. As discussed in greater detail herein, reproducible building techniques are used to create build systems 220, such that the binary packages 225 of one of the build systems 220 should be identical to corresponding binary package 225 of each of the other build systems 220.

Figure 9:
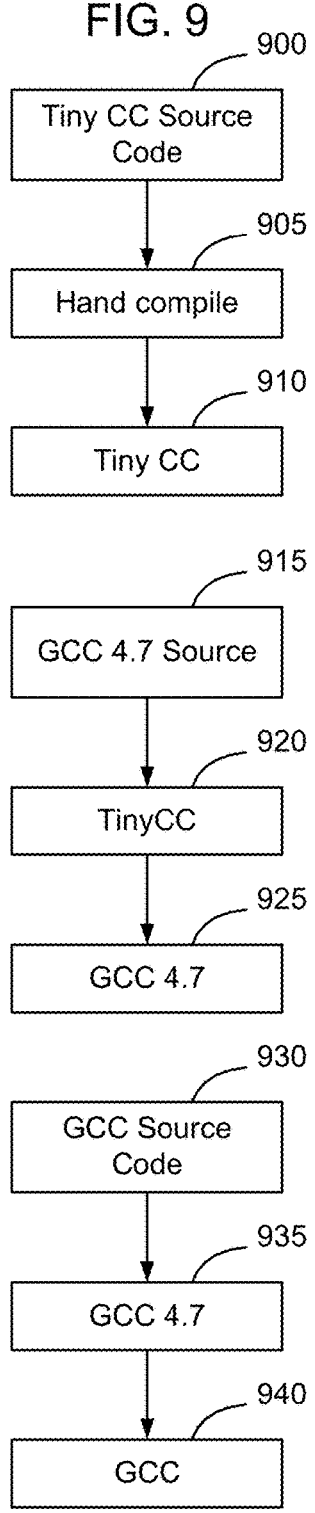
FIG. 9 is a flow chart of an example method of implementing a bootstrappable build, according to some embodiments.
Figure 10:
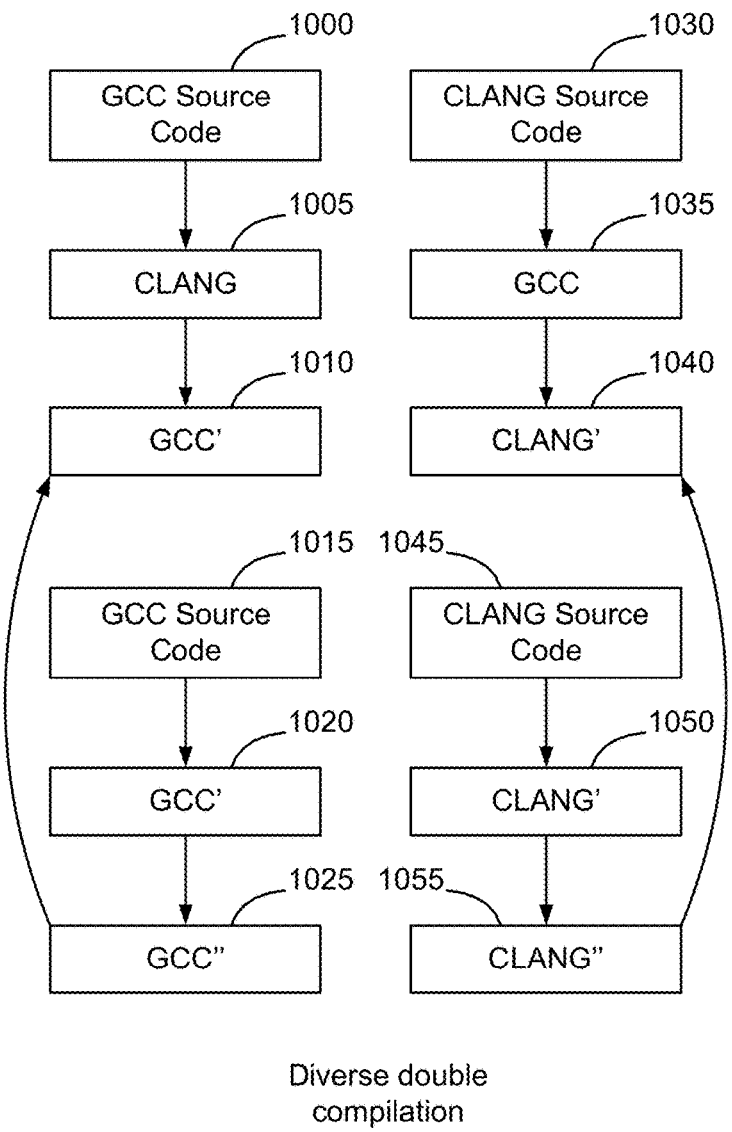
FIG. 10 is a flow chart of an example method of implementing a build using a diverse double compilation, according to some embodiments.

In some embodiments, the software images are compiled using bootstrappable builds, for example as shown in FIG. 9, or are created using diverse double compilation, for example as shown in FIG. 10. The use of bootstrappable builds or diverse double compilation prevents attacks from occurring through use of a corrupt compiler in connection with production of the build systems 220.

In the example shown in FIG. 2, the source package is used to build two independent build systems $220_1$, $220_2$, and each build system includes n binary packages $225_1$, $225_2, \ldots, 225g$. In an actual implementation, multiple independent build systems 220 in excess of two may be created, and each build system 220 may include any number of binary packages 225.

As shown in FIG. 2, in this example a reproducible build process is used to create build system $220_1$ and to independently create build system $220_2$. Each build system 220 includes a binary package for foo 1 $225_1$, a binary package for foo 2 $225_2, \ldots$, and a binary package for foo n $225_n$.

As shown in FIG. 2, (using the symbol #), a hash of the binary package for foo 1 $225_1$ of build system $220_1$ is generated and stored in a distributed ledger configured to store hash records for the binary systems. A hash of the binary package for foo 1 $225_2$ of build system $220_2$ is also generated and stored in the distributed ledger configured to store the hash records for the binary systems. Because the binary packages of the different build systems were produced using reproducible build technology, the hashes of the respective binaries of the build packages $225_1$ and $225_2$ should be identical. These two hashes are compared, for example by the intrusion detection system 420, and if there is a difference between the hashes, it is possible to determine that a change to the source occurred in connection with creation of at least one of the build systems.

Figure 3:
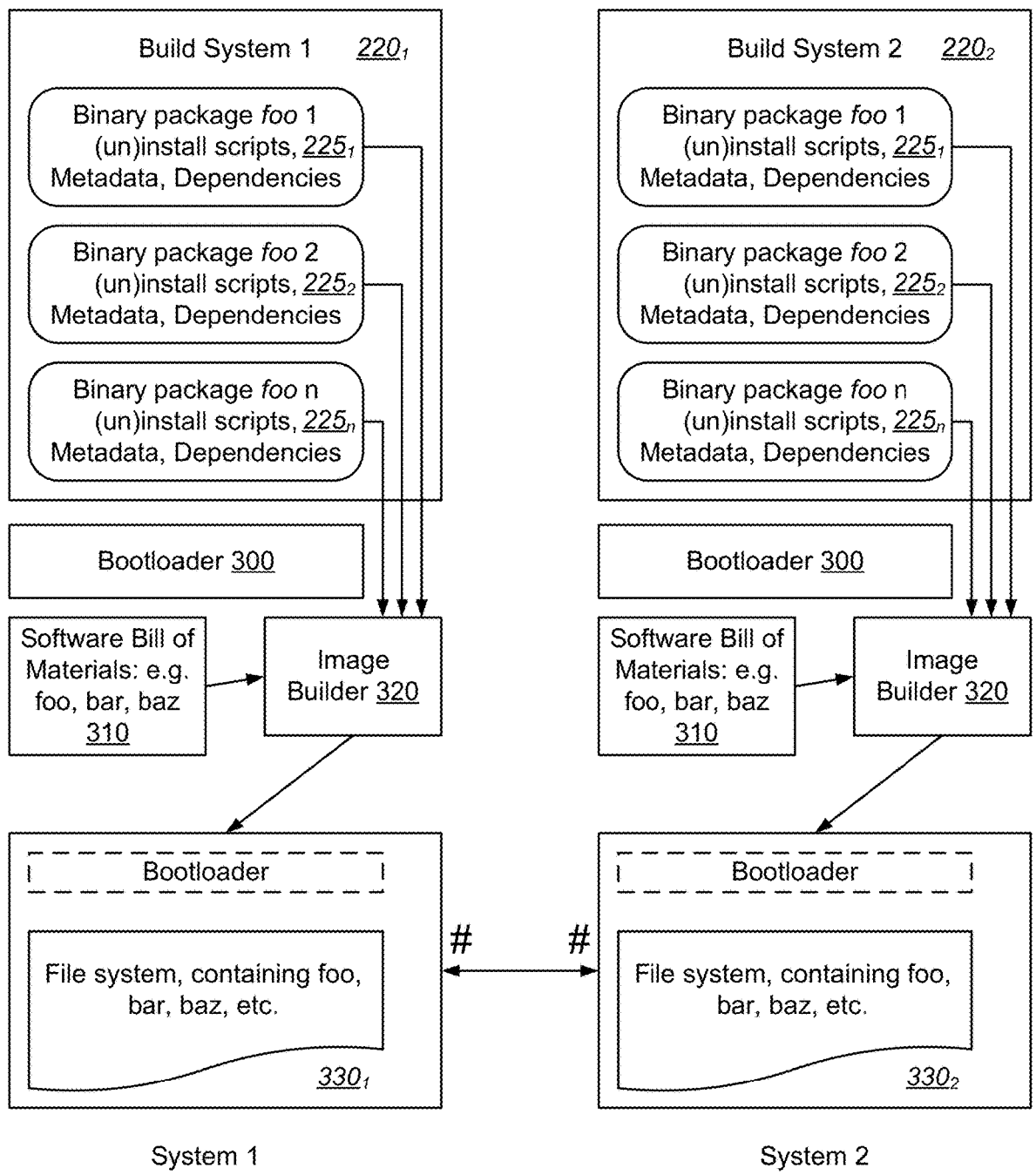
FIG. 3 is a functional block diagram graphically depicting binary images built from binary software packages, including specific stand-alone binary images such as bootloaders, embedded controller code, etc., including dependencies, according to some embodiments. It also depicts that the toolchain e.g. image builder, compilers, etc. must all be running verified code.

FIG. 3 is a functional block diagram graphically depicting binary images built from binary software packages, including specific stand-alone binary images such as bootloaders, embedded controller code, etc., including dependencies, according to some embodiments. It also depicts that the toolchain, e.g. image builder, compilers, etc. must all be running verified code.

As shown in FIG. 3, at the program integration phase 135, an integrator might take the binary packages 225 from the build systems 220, a bootloader 300 (which may be packaged), a software bill of materials 310 indicating the software that is being combined into the program image, e.g. foo, bar, baz, . . . and use an image builder 320 to create a system image 330. As shown in FIG. 3, multiple different build systems 220 are used independently, by unaffiliated entities, to create different software images 330. In FIG. 3, a first build system $220_1$ is used to create a first software image $330_1$, and a second build system $220_2$ is used to create a second software image $330_2$.

As shown in FIG. 3, (using the symbol #), a hash of the first software image $330_1$ is generated and stored in a distributed ledger configured to store hash records for the software images 330. A hash of the second software image $330_2$ is also generated and stored in the distributed ledger configured to store the hash records for the software images 330. If the software images 330 are based on identical build systems, the hashes should be identical. These two hashes are compared, for example by one or more of the intrusion detection systems 420, and if there is a difference, it is possible to determine that a change to one of the build systems has occurred, which may indicate that one of the build systems has been attacked, or that the build of that software package was not reproducible. Either possibility should be investigated and resolved.

Figure 4:
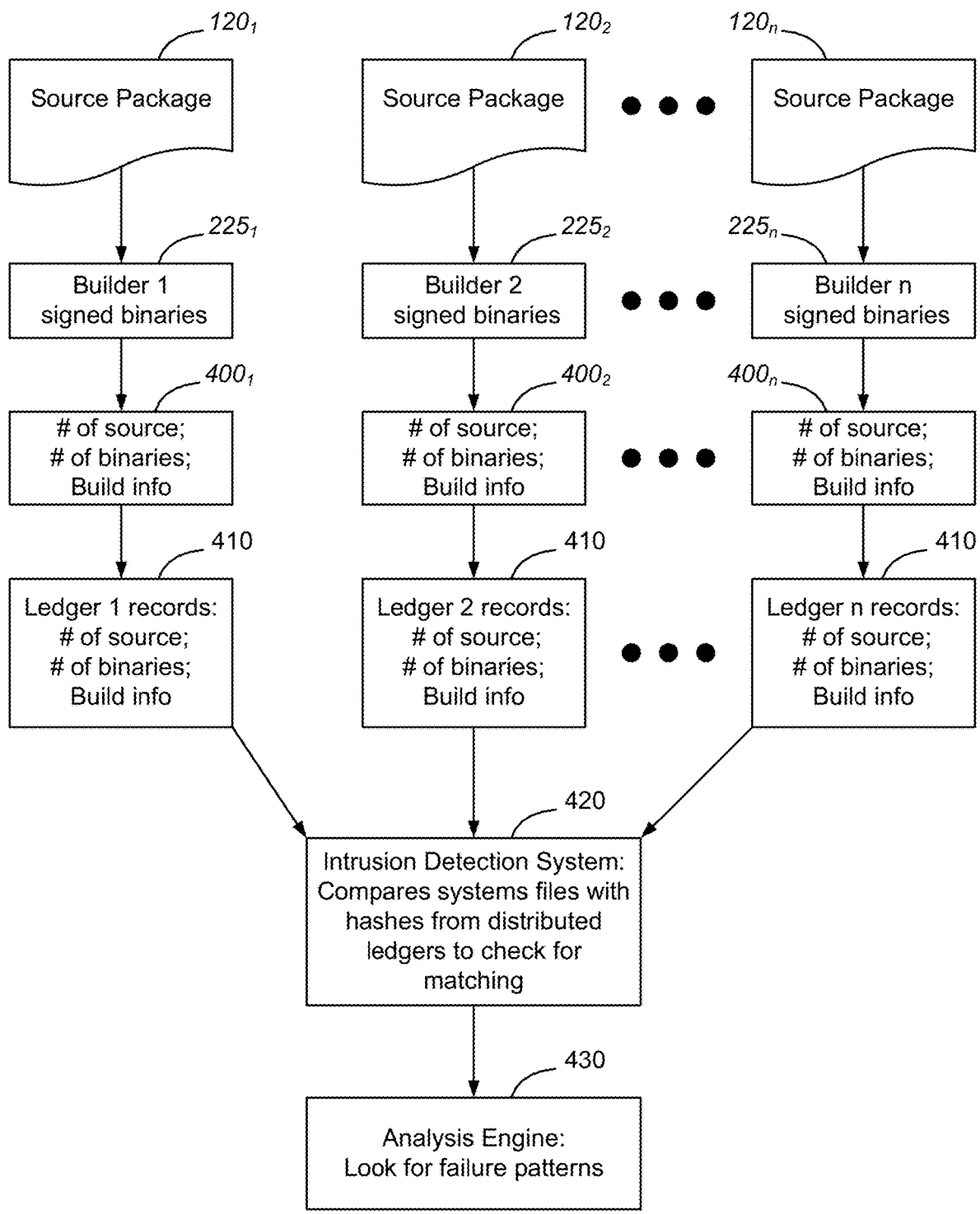
FIG. 4 is a functional block diagram graphically depicting the generation of the hashes from the source packages for generic software, being done by different builders independently and generating different ledger records, verified against each other by an intrusion detection system, according to some embodiments.

FIG. 4 is a functional block diagram graphically depicting the generation of the hash records from signed binaries created by different builders. As shown in FIG. 4, each builder creates a set of signed binaries $225_1$-$225_n$. Each builder then creates a hash record $400_1$-$400_n$, which includes a respective hash of the source 120, a hash of the binaries 225, and build information. The hash record 400 stored in a distributed ledger 150, and the ledger records (at blocks $410_1$-$410_n$) the content of the hash record, namely the hash of the source, hash of the binaries, and the build information.

Each of the builders independently produces the hash records 400, and each hash record is separately recorded in one or more distributed ledgers. An intrusion detection system 420 compares the hash records 400 from the different builders to ensure that each hash record 400 contains identical hash values for the independent builds.

If the intrusion detection system determines that different hash records 400 from different builders contain different hash values, the comparison results may be provided to an analysis engine 430. In some embodiments, the analysis engine 430 is a neural network trained to look for patterns, by matching failures, which would indicate that one or more of the source packages, or other aspects of the software supply chain, have been attacked. For example, if the hash records of one particular builder don't match the hash records of any of the other builders, it is likely that the particular builder is creating a build based on tampered source code, or the software build is not reproducible. Other failure patterns may be detected as well. By implementing real-time or near real time detection of differences in hash records 400, it is possible to provide early detection of changes to source code to thereby prevent malicious attacks at the source, or within the software supply chain, rather than waiting an indeterminate time and later using anti-virus type detection of problems in customer end systems 140.

Figure 5:
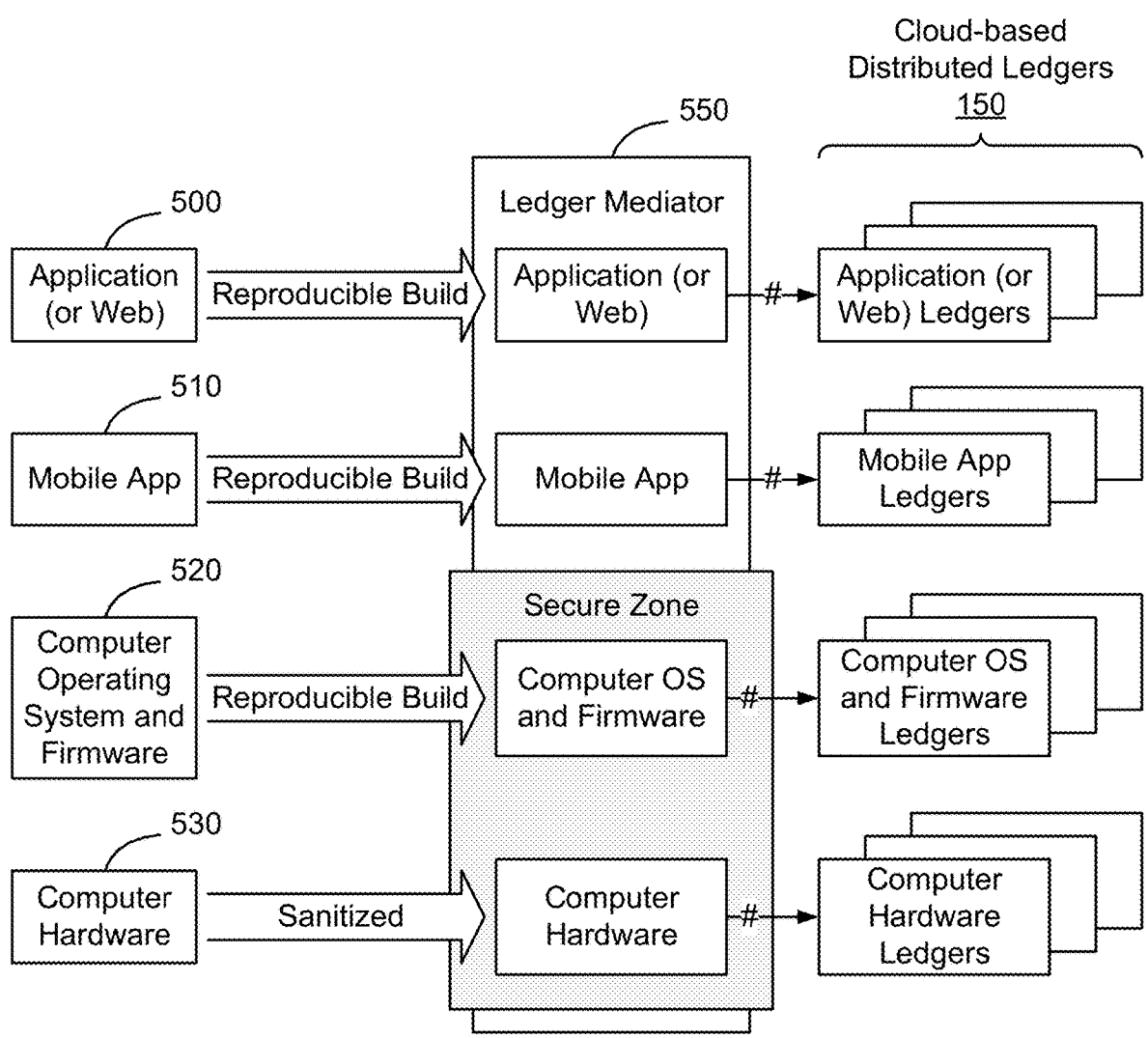
FIG. 5 is a functional block diagram graphically depicting a consolidated view of reproducible builds of applications, operating systems, firmware, and hardware, and a corresponding set of distributed ledgers, according to some embodiments.

FIG. 5 is a functional block diagram graphically depicting a consolidated view of reproducible builds of applications, operating systems, firmware, and hardware, and a corresponding set of distributed ledgers, according to some embodiments. As shown in FIG. 5, in some embodiments any software, operating system, firmware, or computer hardware that is created using reproducible build technology can participate in the software ecosystem 100 of FIG. 1. Example applications include software applications 500 designed to run on laptop or other computers or web applications, as well as mobile applications 510 designed to run on mobile devices such as iPhones and Android devices. Any application may be implemented to participate in the software ecosystem. Similarly, containerized systems with one or more pieces of software, for example containerized applications deployed on multiple systems, can be validated using the distributed ledgers.

Likewise, firmware, BIOS, and operating systems 520 that can be created using reproducible builds, can participate in the software ecosystem such that the content of the firmware, BIOS, and operating systems to be verified using hash records stored on distributed ledgers. Finally, the computer hardware 530 itself may be sanitized and hashes of the sanitized computer hardware may be compared with other hashes of other versions of sanitized computer hardware, using the distributed ledgers. Accordingly, as more instances are implemented using reproducible builds, the software ecosystem 100 may grow exponentially.

In connection with firmware, in many instances firmware is no different than software, in that it is produced and then reduced to binary form. Accordingly, using the distributed ledgers discussed herein, it is possible to verify that the current version of firmware on a device such as a router, automobile, or other device, is operating using the correct version of firmware. This applies to individual pieces of firmware all the way up to the system level. An automobile is an example of a complex system that has numerous pieces of firmware designed to control steering, braking, and numerous other functions. The use of distributed ledgers to verify the firmware in these and other complicated systems can help prevent these systems from being attacked at the firmware level.

In some embodiments, a set of cloud based distributed ledgers 150 are provided. In some embodiments, multiple distributed ledgers 150 are used, in which one or several distributed ledgers is used for each component that is included in the software ecosystem 100. For example, a first set of distributed ledgers 150 may be used for computer software applications or web applications 500 and a second set of distributed ledgers may be used in connection with mobile apps.

Multiple distributed ledgers 150 may thus be implemented. To enable the hash records 400 to be directed to the correct distributed ledger 150, in some embodiments the software ecosystem includes a ledger mediator 550 containing metadata identifying the location(s) of the particular cloud-based distributed ledger for each of the participants in the software ecosystem 100. In some embodiments, the metadata identifying the locations of the distributed ledgers, and the identity of the distributed ledgers that are used for particular software components, is itself recorded in one or more of the distributed ledgers to prevent the ledger mediator 550 from becoming vulnerable to attack.

In some embodiments, hash records 400 are stored in distributed ledgers using a distribution environment similar to how TLS/SSL certificates are distributed. For example, one possible attack would be for an attacker to try to get a user to install incorrect software. When a hash of the software was generated, the attacker could then intercept the hash, replace the hash with a hash of the correct software, and forward that to the distributed ledger. In that form of man-in-the middle attack, the intrusion detection system would not detect a problem with the software installed on the end user's machine, unless several independent ledgers are consulted. Single points of failure of all types must be avoided. Likewise, if the end user had installed malware that was detected by the intrusion detection system, and the attacker was able to intercept a notice from the intrusion detection system to the end user, it would also be possible for the attacker to change the notification to indicate that the hashes matched.

According to some embodiments, the use of hash records stored in the distributed ledgers and communication from the distributed ledgers or the intrusion detection system and participants in the software supply chain are protected using a system similar to a certificate transparency system.

Figure 6:
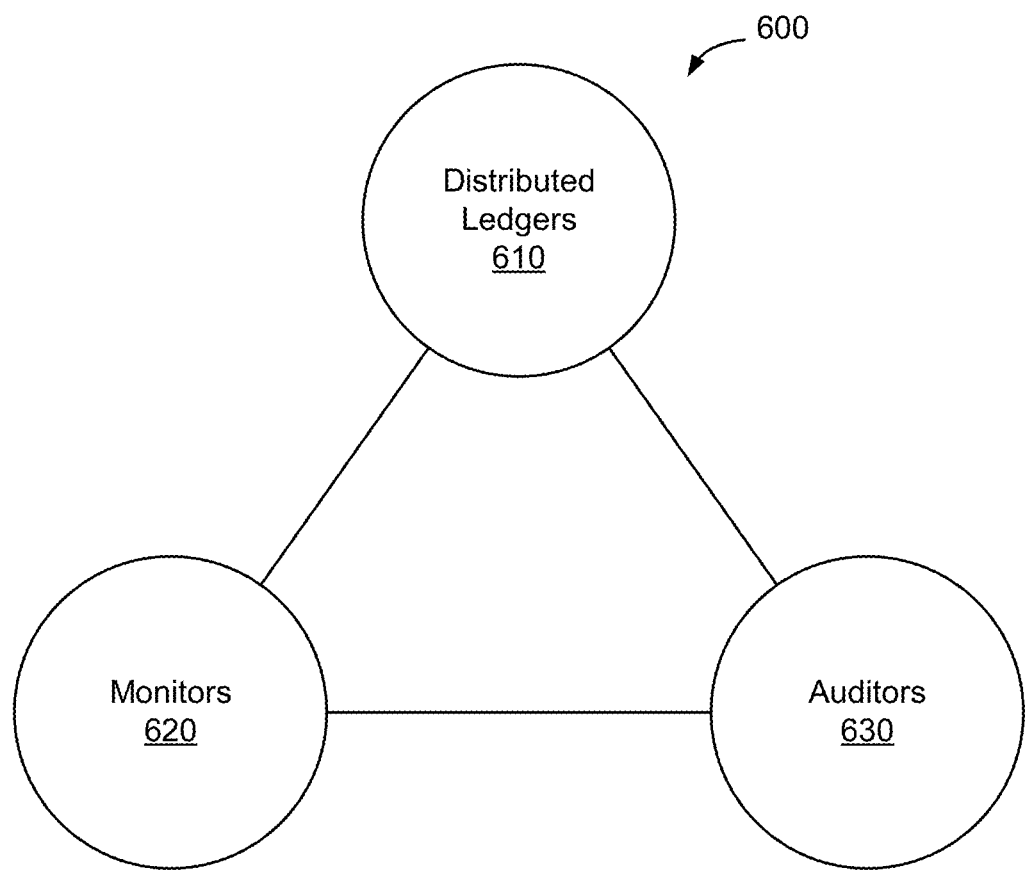
FIG. 6 is a functional block diagram of an example framework for monitoring communications between components of the software chain and the distributed ledgers, according to some embodiments.

FIG. 6 is a functional block diagram of an example framework for monitoring components of the software chain and the distributed ledgers, according to some embodiments. As shown in FIG. 6, the framework 600 includes three components: distributed ledger 610, monitors 620, and auditors 630. Secure ledgers are simple network services that maintain cryptographically assured, publicly auditable, append-only records of the components of the software supply chain and the distributed ledgers. In some embodiments, the distributed ledgers are implemented using Merkle Trees, although other secure ledger technologies may be used as well. Anyone can submit a record to a ledger that they own. Likewise, anyone can query a ledger for a proof, which can be used to verify that the ledger is behaving properly or verify that a particular operation has been logged. Monitors 620 are publicly run servers that periodically contact ledgers of interest, and watch for suspicious operations. Auditors 630 are lightweight software components that typically perform two functions. First, they can verify that ledgers are behaving correctly and are cryptographically consistent. Second, they can verify that a particular operation appears in a ledger. If an expected operation has not been registered in a ledger, or an unexpected operation is added to a ledger, it's a sign that the ledger is suspect. Although an example framework for securing the components of the software supply chain and the distributed ledgers is shown in FIG. 6, other ways of monitoring ledgers may be used as well.

Figure 7:
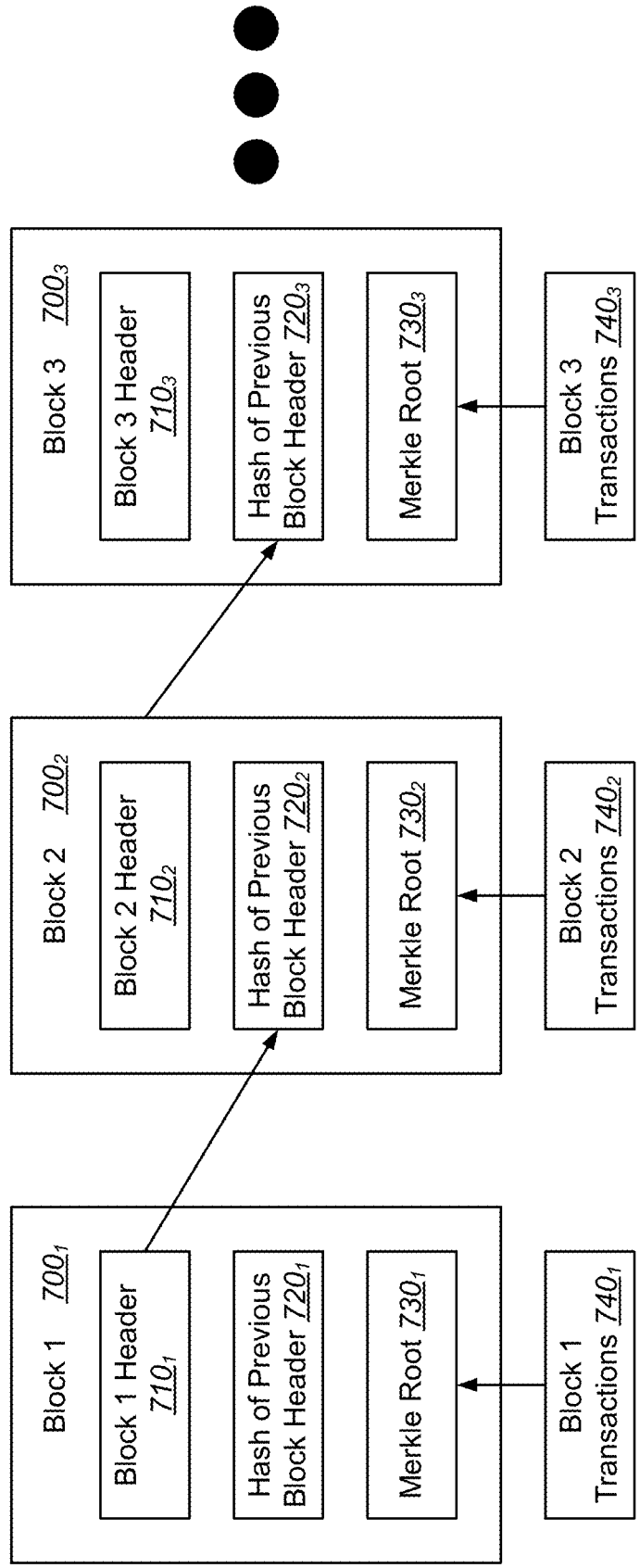
FIG. 7 is a functional block diagram of an example distributed ledger implemented using block chain technology, according to some embodiments.

FIG. 7 is a functional block diagram of an example distributed ledger implemented using block chain technology, according to some embodiments. As shown in FIG. 7, at a high level a distributed ledger 150 can be thought of as a series of interconnected blocks $700_1$, $700_2$, $700_3$, etc. Each block has a header 710, a hash of a previous block header 720, and a Merkle root 730. Transactions 740 associated with the block are used to create a Merkle tree based at the Merkle root. A Merkle tree, in this context, is a tree data structure in which each leaf node is labeled with the cryptographic hash of a data block, and each non-leaf node is labeled with the cryptographic hash of the labels of its child nodes. In the context of software ecosystem 100 described herein, the block transactions $740_1$-$740_n$ are the hash records 400. By storing the hash records 400 in blocks 700 of a distributed ledger such as the distributed ledger shown in FIG. 7, it is possible to ensure that the hash records are not modified once they are stored in the distributed ledger. Specifically, the block chain structure is configured such that it is not possible to alter an earlier block of the chain in an undetectable manner, which ensures that the earlier recorded hash records 400 cannot be changed after being recorded in the distributed ledgers 150.

Figure 8:
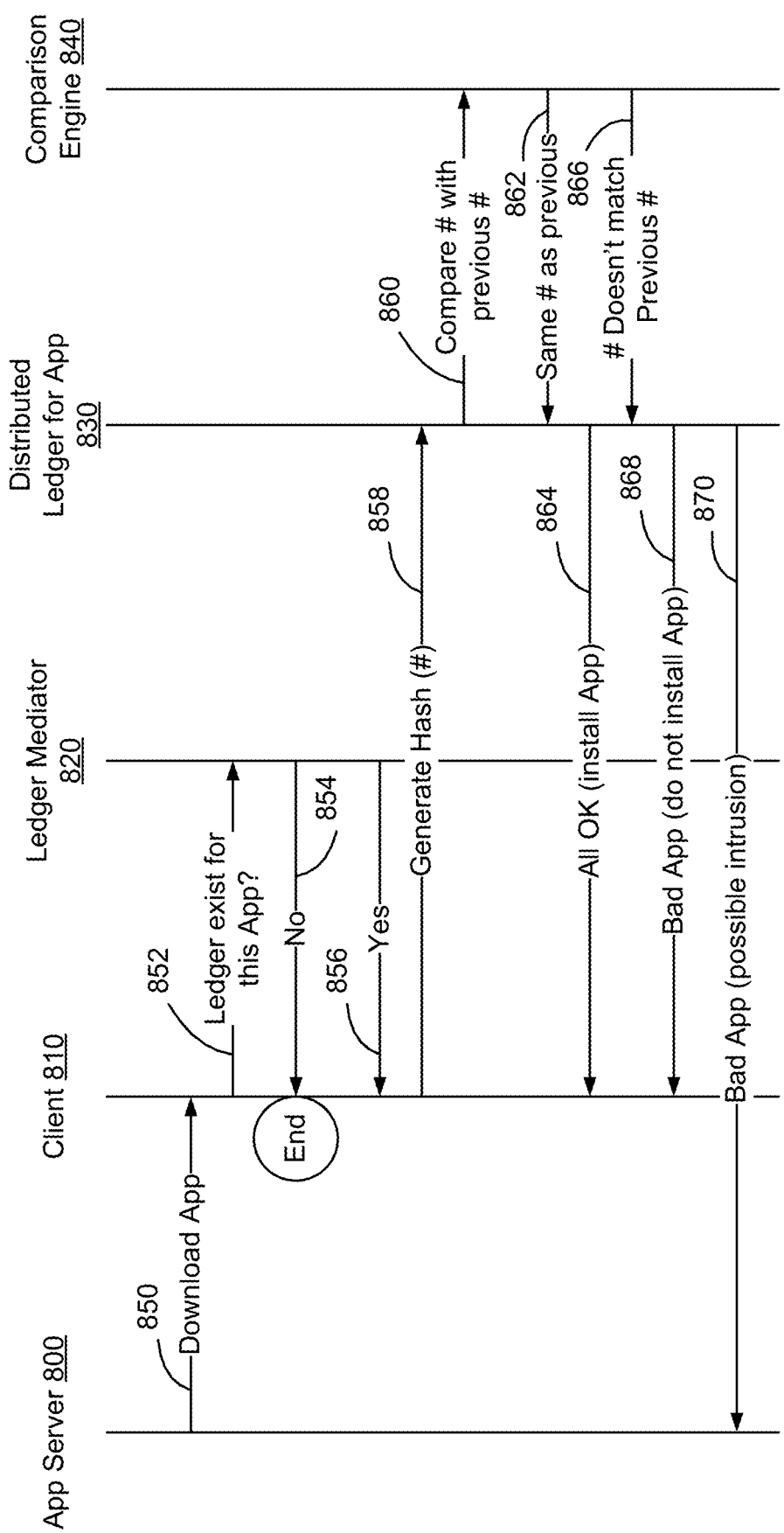
FIG. 8 is a swim lane diagram showing an example exchange of information between components of a software ecosystem configured to enable the secure creation and delivery of software, according to some embodiments.

FIG. 8 is a swim lane diagram showing an example exchange of information between components of a software ecosystem configured to enable the secure creation and delivery of software, according to some embodiments. As shown in FIG. 8, in this example there is an application server 800 which may be, for example, a location on the Internet where a person might go to download an application for use on their computer or mobile phone. An example of an application server is the Apple™ app store, although it could be any source of software that was produced using reproducible build techniques.

A client 810 contacts the app server 800 and selects an application to download (arrow 850). The client 810 then contacts the ledger mediator 820 to determine if there is a ledger for the application (arrow 852). The ledger mediator 820 responds with either a NO answer (arrow 854) or a YES answer (arrow 856) including the identity and location of the distributed ledger(s). If the answer is NO (arrow 854) the application is not part of the software ecosystem 100, and the process ends. If the answer is YES (arrow 856), the selected application is participating in the software ecosystem 100. Accordingly, the client 810 generates a hash record 400 based on the downloaded application and transmits (arrow 858) the hash record to the distributed ledger 830 for the application that was identified by the ledger mediator 820.

The distributed ledger 830 adds the hash record 400 to the distributed ledger, and a comparison engine, such as the intrusion detection system 420 (arrow 860), compares the hash of the application with previous hashes of the application stored in the distributed ledger (arrow 840). In some embodiments, the comparison (arrow 840) is implemented by the intrusion detection system 420 described in connection with FIG. 4. If the hash matches previous hash values (arrow 862), the distributed ledger 830 responds to the client (arrow 864) that all is OK. The client thus knows that the application that was downloaded from the app server is the same as all other instances of that application, and can confidently be installed on the client device. If the hash provided by the client 810 does not match previous hashes (arrow 866), the distributed ledger responds to the client (868) that the application that was downloaded does not match other versions of the application that were downloaded by other users. Optionally, the distributed ledger may also notify (arrow 870) the application server 800, the intrusion detection system, or other participants in the software ecosystem 100.

Although an example ecosystem has been described in which the software supply chain and distributed ledgers are used, this does not prevent other techniques from being used to supplement security. For example, intrusion detection systems such as are commercially available from "tripwire" and "samhain", OSSEC and Wazuh may be used to monitor components of the software supply chain and/or distributed ledgers. Where an intrusion is detected, hashes of all software components of the compromised machine can be generated and sent to the respective ledgers. In this manner, a machine that is suspected to be compromised can be quickly scanned to determine what software components are affected so that remedial action can be taken to shut down the intrusion and minimize harm associated with the intrusion.

Similarly, although some embodiments have been described in connection with creation of software and downloading the software to an end user, in some embodiments the end user is configured to generate hash records of software at various points in time, such as once per month, once per week, or even every time the software is used, to enable the content of the software to be verified on a periodic or instantaneous basis. In this manner, the continued viability of the trustworthiness of the software can be verified.

In some embodiments, anti-viral software is configured to periodically or on demand generate hash records of OS, bios, firmware, and software on end user machines, to verify that the end user machine is running the correct versions of the software. This can be done periodically, or on demand, for example where an attack is detected by the intrusion detection system. In this manner, the participation in the software ecosystem 100 is seamless to the end user, thus furthering adaptation at large scale. This information might be provided by a secure ledger to third parties to increase confidence in the results of that system or internet service.

New methods, steps, operations are discussed herein to illustrate the implementations of reproducible builds, hash generators, ledgers including transparent logs, intrusion detection systems, hardware sanitization and checking for security in order to provide a thorough understanding of the present invention. It will be evident that the present invention may be practiced by one skilled in this art without these specific details.

The three approaches to implementing a secure software ecosystem include the software platform that assures the integrity of software that is running, creating/hosting authenticated second builds for software, thus ensuring provenance, and building secure systems based on the combination of software and hardware. This approach results in a secure software ecosystem with validated processes for software writing and distribution.

In some embodiments, the Reproducible Build of an Operating System can be implemented while generating the appropriate structure of hashes which are then stored in ledgers as illustrated in FIGS. 2 and 4. The ledgers are independent to ensure their integrity and contain the hashes generated from multiple independent builds. These are then checked against during installation time, to ensure the integrity of the system in which the Operating System is being installed. Additional enhancements or modifications of the Operating System that will be downloaded at a later stage are also checked for integrity in the distributed ledgers. Continuous monitoring of the system is implemented using Intrusion Detection, using the hashes found in the ledgers, providing integrity after initial installation.

In some embodiments, the hardware computer system where the software is to be installed is checked for integrity, and steps are taken to "sanitize" the computer hardware for security to determine that there are no malicious components of any software. This is then followed by the process of installing a Reproducible Build with integrity checks against a distributed ledger system.

In some embodiments, illustrated in FIGS. 4 and 5, the binary images which are usually built from binary software packages, and sometimes specific stand-alone binary images such as bootloaders, Embedded Controller code, etc., and anything that they depend on, are then inserted into flash in the components of systems such as Basic Input Output System (BIOS), Embedded Controller, other processor flash, or installed by the customer. In such a practice the toolchain, e.g. image builder, compilers, etc. must all be running verified code. The software ecosystem 100 described herein, based on Reproducible Builds and distributed ledgers, enables independent verification of compiled code running on a system. This removes the tampering of the software supply chain and will make it "a thing of the past", allowing the verification of that delivered software and that it has not been tampered with. Applications of this approach can be implemented on a broad range of embedded computer systems such as standalone computers, networking routers, and automotive systems wherein there is little or no manual operation.

In some embodiments, the software ecosystem 100 can be used to ensure the veracity of end user software that is typically run on home computers, on phone systems, or as web applications which are downloaded from a server or a computer system. Examples of such applications included Voter ID systems, authentication/verification systems, etc.

In some embodiments, the Reproducible Builds application by distributed ledger and intrusion detection system is used as a cyber-security gateway to a new digitally controlled and monitored entrepôt, represented in FIG. 5, wherein the Secure Zone addresses and implements these requirements. This modern security-based entrepôt would be facilitated by digitally-enabled hardware and software first clearing the inspection, designed using this the software ecosystem 100 described above.

Figure 11:
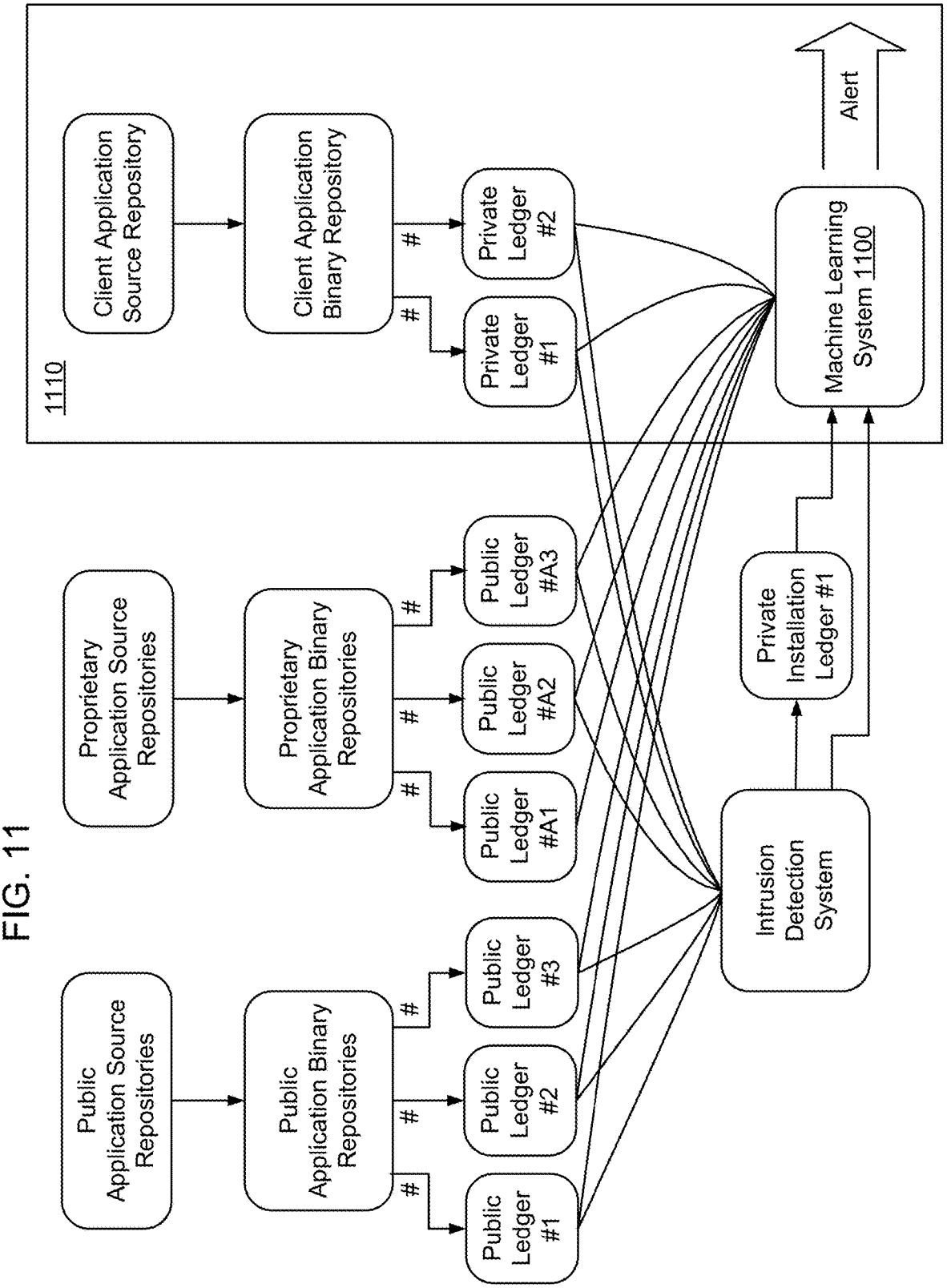
FIG. 11 is a functional block diagram showing an example flow of information between participants in a software ecosystem, enabling robust independent verification of software via ledgers, according to some embodiments.

FIG. 11 is a functional block diagram showing an example flow of information between participants in a software ecosystem, enabling robust independent verification of software via ledgers, according to some embodiments. As shown in FIG. 11, in some embodiments a ledger is maintained of all packages installed in a container or system 1110, which is monitored on an on-going basis. An intrusion detection system monitors the hash ledgers to look for hash failures. Hash failures, in some instances, are indicative of active attacks. In some embodiments, a machine learning process 1100 is used to evaluate the hash failures detected by the intrusion detection system to resolve whether the same hash failure patterns are occurring on multiple containers or systems. When patterns indicative of a possible attack are detected by machine learning system 1100, an alert may be generated. By using the system described herein, it is possible to protect the container or system against tampering. It is also possible to easily monitor the container or system 1110, to determine whether the system is being updated properly, because the client intrusion detection system 1100 is able to check the client ledgers (private ledger #1 and private ledger #2) against the public ledgers. This enables integrity checking of external microservices provided by a third party, such as in the public Internet or in a large intranet. For example, when accessing a web service from a website on the Internet, it is possible to determine whether the software being used to implement the web service is authentic, which reduces the necessity of relying on the good faith of the provider.

Figure 12:
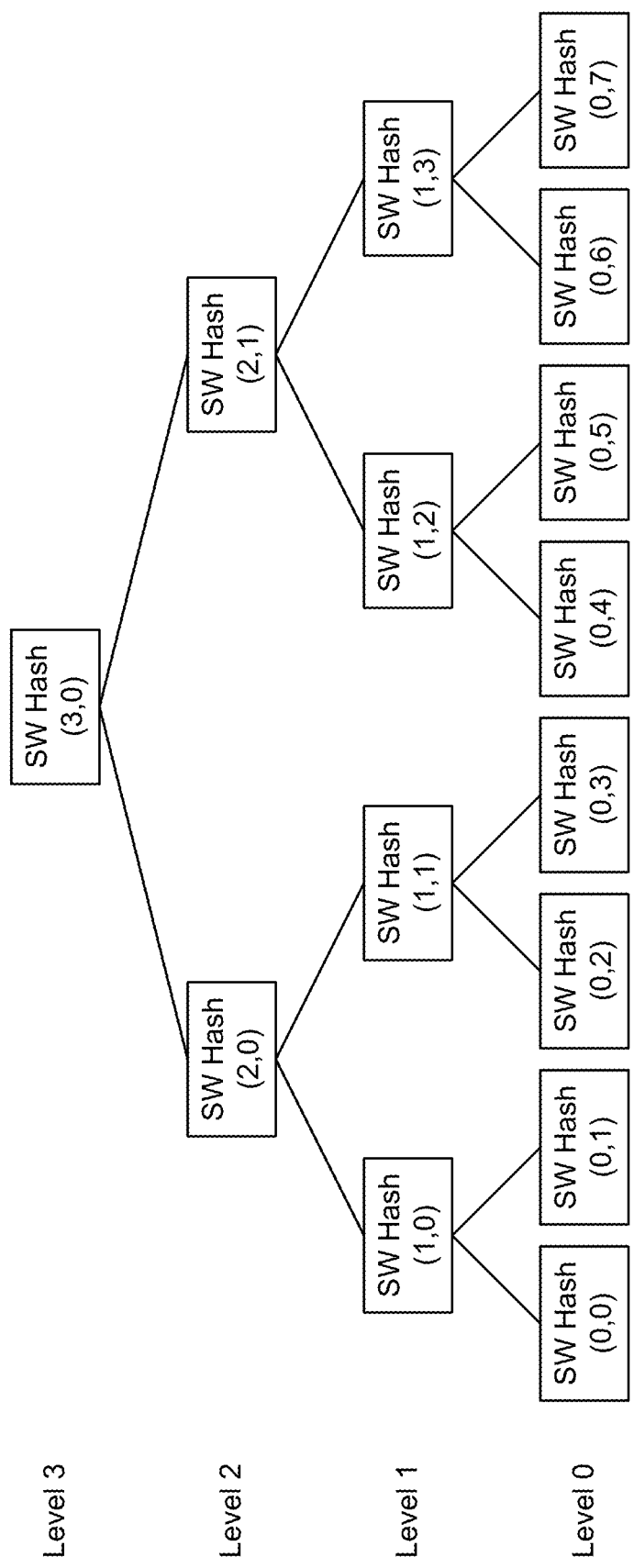
FIG. 12 is a functional block diagram of a portion of an example ledger implemented as a Merkle tree, according to some embodiments.

FIG. 12 is a functional block diagram of a portion of an example ledger implemented as a Merkle tree, according to some embodiments. Merkle trees have many forms, and the example ledger shown in FIG. 12 is a basic form of an example portion of a Merkle tree.

In cryptography, a hash function is a deterministic function that maps an arbitrary size message M (e.g. binary software package) to a small fixed size output message H(M) (e.g. 256 bit file). The hash function has the property that it is infeasible in practice to produce any pair of output messages H(M) from the hash function that are identical, unless the input messages M are also identical.

A Merkle tree, in general, is a tree-shaped data structure constructed from hashed messages H(M). Each message, in our application—each software file, is hashed using a hash function, and those hash functions are stored at the lowest layer (layer 0) of the Merkle tree. There are many hash functions that can be used, e.g. SHA-256, and the particular hash function will depend on the particular embodiment.

Each of the higher layers of the Merkle tree are formed by applying the hash function to the concatenation of the two lower hashes. For example, Software (SW) Hash (1,0) is the hash located at level 1 of the Merkle tree, and is formed by concatenating SW Hash (0,0) and SW Hash (0,1), and then applying the hash function to this concatenated value. This process applies for each of the additional upper levels of the Merkle tree. Since Merkle trees are well known in cryptography, additional details and optimizations are not included herein since these aspects would be well known to a person of ordinary skill in the art. Accordingly, the particular manner in which the ledger is implemented will depend on the particular embodiment, and FIG. 12 is merely intended to illustrate one possible way of implementing an example portion of a ledger.

As described above, in some embodiments the reproducible builds are expected to produce identical binary images, which would produce identical hashes that are stored in the distributed ledgers. Since each of the hashes at the lowest layer should be identical, it would be expected that each of the hashes at the higher layers would also be identical. Thus, in some embodiments, the intrusion detection system monitors the ledgers at an arbitrary higher level rather than monitoring the ledgers at the lowest layer (layer 0). This reduces the monitoring burden, because the intrusion detection system only needs to access and evaluate the fewer entries of the distributed ledger at the higher level, rather than evaluating every entry at layer 0. For example, if the intrusion detection system monitored the ledger at layer 7, it would be required to monitor $1/256$ as many entries. If a difference in hash values was detected at that arbitrary higher level, the intrusion detection system could then dig down into the Merkle tree to identify the SW hash(es) at level 0 that caused the problem.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified nouns, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method to publish a provenance of a system providing a service to enable higher assurance of the service's integrity to either an owner of the service or third parties, the method comprising:
   independently producing software using reproducible build technology by a set of third parties to cause each instance of the software to have the identical binary image;
   creating hash values of the binary images of the software;
   storing the hash values in a set of distributed ledgers;
   generating a hash value of software used by the system to provide the service;
   storing the hash value of the software used by the system in the distributed ledgers; and
   detecting, from a comparison of the hash value of the software used by the system to the hash values of the binary images of the software produced by a set of independent third parties, whether the software used by the system is the same as the other instances of the software.

2. The method of claim 1, further comprising:
accessing the service;
wherein detecting whether the software used by the system is the same as the other instances of the software is implemented before accessing the service.

3. The method of claim 1, wherein the system providing the service is an Internet web server.

4. The method of claim 1, wherein the set of distributed ledgers are secure distributed ledgers.

5. The method of claim 1, wherein the set of distributed ledgers are implemented using Merkle Tree data structures.

6. The method of claim 1, wherein the set of distributed ledgers are implemented using blockchain data structures.

7. The method of claim 1, wherein generating the hash value of software used by the system, storing the hash value of the software used by the system in the set of distributed ledgers, and detecting whether the software used by the system is the same as the other instances of the software, is done either on a periodic or continuous basis.

8. The method of claim 1, wherein the reproducible build technology provides an independently-verifiable path from source code to binary code to enable independent verification of a software supply chain used to create the software.

9. The method of claim 8, wherein the reproducible build technology includes a process of compiling the software using a deterministic compilation process.

10. The method of claim 1, wherein independently producing software is further implemented using bootstrappable build technology to prevent use of a corrupt compiler in connection with compiling the software.

11. The method of claim 1, wherein independently producing software is further implemented using diverse double compilation to prevent use of a corrupt compiler in connection with compiling the software.

12. The method of claim 1, further comprising:
cryptographically signing the hash values; and
transmitting the cryptographically signed hash values to the distributed legers to be stored in the distributed ledgers.

13. The method of claim 1, wherein detecting whether the software used by the system is the same as the other instances of the software is implemented by an intrusion detection system configured to monitor the system and multiple other similarly configured systems.

14. The method of claim 13, wherein the intrusion detection system includes a trained machine learning algorithm configured to detect patterns in software failures associated with mismatched hash values.

15. The method of claim 1, wherein the software is implemented as embedded firmware.

16. The method of claim 1, wherein the software is a binary image of source code.

17. The method of claim 1, wherein the software includes all software components of a container of an embedded system, or all software components of a general purpose computing system.

* * * * *